(12) United States Patent
Xu

(10) Patent No.: US 12,495,012 B2
(45) Date of Patent: Dec. 9, 2025

(54) MESSAGE DISPLAY METHOD AND APPARATUS AND ELECTRONIC DEVICE

(71) Applicant: VIVO MOBILE COMMUNICATION CO., LTD., Dongguan (CN)

(72) Inventor: Jie Xu, Hangzhou (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 204 days.

(21) Appl. No.: 18/372,429

(22) Filed: Sep. 25, 2023

(65) Prior Publication Data

US 2024/0015119 A1    Jan. 11, 2024

Related U.S. Application Data

(63) Continuation of application No. PCT/CN2022/083453, filed on Mar. 28, 2022.

(30) Foreign Application Priority Data

Apr. 1, 2021 (CN) .......................... 202110357084.4

(51) Int. Cl.
*H04L 51/04* (2022.01)
*H04L 51/07* (2022.01)
*H04L 51/21* (2022.01)
*H04L 51/214* (2022.01)
*H04L 51/216* (2022.01)

(52) U.S. Cl.
CPC .............. *H04L 51/04* (2013.01); *H04L 51/07* (2022.05); *H04L 51/214* (2022.05); *H04L 51/216* (2022.05); *H04L 51/21* (2022.05)

(58) Field of Classification Search
CPC ......... H04L 51/04; H04L 51/07; H04L 51/21; H04L 51/214; H04L 51/216
See application file for complete search history.

(56) References Cited

U.S. PATENT DOCUMENTS

| | | | |
|---|---|---|---|
| 2016/0034558 A1 | 2/2016 | Duan et al. | |
| 2016/0337291 A1* | 11/2016 | Park | H04L 51/214 |
| 2017/0054664 A1* | 2/2017 | Lee | H04L 51/216 |
| 2017/0288887 A1* | 10/2017 | Wang | H04W 4/14 |
| 2019/0317709 A1 | 10/2019 | Sugimoto et al. | |
| 2021/0258181 A1* | 8/2021 | Han | G06Q 50/40 |
| 2021/0273894 A1 | 9/2021 | Tian et al. | |
| 2022/0397992 A1 | 12/2022 | Xie | |

FOREIGN PATENT DOCUMENTS

| | | |
|---|---|---|
| CN | 105450497 A | 3/2016 |
| CN | 110138645 A | 8/2019 |
| CN | 111147661 A | 5/2020 |

(Continued)

*Primary Examiner* — Ting Z Lee
(74) *Attorney, Agent, or Firm* — The Webb Law Firm

(57) ABSTRACT

A message display method includes receiving a first input of a user for a first label of a first group and a first contact in a first contact list, the first label being used to indicate a real-time chat message belonging to a first chat topic; displaying a chat interface of a second group in response to the first input, the second group being a group created according to the first contact and the first label; and when a first chat message belonging to the first chat topic is received by the first group, updating and displaying the first chat message in the chat interface.

20 Claims, 8 Drawing Sheets

Receive, by a message display apparatus, a first input of a user for a first label of a first group and a first contact in a first contact list — S101

Display, by the message display apparatus, a chat interface of a second group in response to the first input — S102

Update and display, by the message display apparatus, and in a case that a first chat message belonging to a first chat topic is received by the first group, the first chat message in the chat interface — S103

(56) References Cited

FOREIGN PATENT DOCUMENTS

| CN | 111371677 | A | 7/2020 |
| CN | 111865760 | A | 10/2020 |
| CN | 113259221 | A | 8/2021 |
| JP | 2004355388 | A | 12/2004 |
| WO | 2020096087 | A | 5/2020 |

* cited by examiner

MESSAGE DISPLAY METHOD AND APPARATUS AND ELECTRONIC DEVICE

CROSS-REFERENCE TO RELATED APPLICATIONS

This application is a Bypass Continuation Applications of International Patent Application No. PCT/CN2022/083453 filed Mar. 28, 2022, and claims priority to Chinese Patent Application No. 202110357084.4 filed Apr. 1, 2021, the disclosures of which are hereby incorporated by reference in their entireties.

BACKGROUND OF THE INVENTION

Field of the Invention

This application belongs to the technical field of communications, and particularly relates to a message display method and apparatus and an electronic device.

Description of Related Art

With the development of a communication technology, electronic devices are widely used in communication and exchange among users.

Usually, the users can share messages from a group with their contacts. For example, when a contact A is interested in a price reduction message in a user's shopping group, the user can trigger the electronic device to copy the price reduction message and send the price reduction message to the contact A, thereby realizing message sharing.

Based on the above method, in a case of frequently updating real-time messages in a group, if the users want to share these real-time messages with contacts, they need to trigger the electronic device multiple times to copy and send the real-time messages in the group, resulting in a cumbersome way for the electronic device to share the messages.

SUMMARY OF THE INVENTION

In a first aspect, an embodiment of this application provides a message display method, including: receiving a first input of a user for a first label of a first group and a first contact in a first contact list, the first label being used to indicate a real-time chat message belonging to a first chat topic; displaying a chat interface of a second group in response to the first input, the second group being a group created according to the first contact and the first label; and updating and displaying, in a case that a first chat message belonging to the first chat topic is received by the first group, the first chat message in the chat interface.

In a second aspect, an embodiment of this application provides a message display apparatus, including: a receiving module and a displaying module. The receiving module is configured to receive a first input of a user for a first label of a first group and a first contact in a first contact list, and the first label is used to indicate a real-time chat message belonging to a first chat topic. The displaying module is configured to display a chat interface of a second group in response to the first input received by the receiving module, the second group being a group created according to the first contact and the first label; and update and display, in a case that a first chat message belonging to the first chat topic is received by the first group, the first chat message in the chat interface.

In a third aspect, an embodiment of this application provides an electronic device, including a processor, a memory, and a program or an instruction stored in the memory and executable on the processor, and when the program or the instruction is executed by the processor, steps of the method in the above first aspect are implemented.

In a fourth aspect, an embodiment of this application provides a non-transitory readable storage medium, storing a program or an instruction, and when the program or the instruction is executed by a processor, steps of the method in the above first aspect are implemented.

In a fifth aspect, an embodiment of this application provides a chip, including a processor and a communication interface, the communication interface is coupled to the processor, and the processor is configured to run a program or an instruction to implement the method in the above first aspect.

DESCRIPTION OF THE INVENTION

Figure 1:
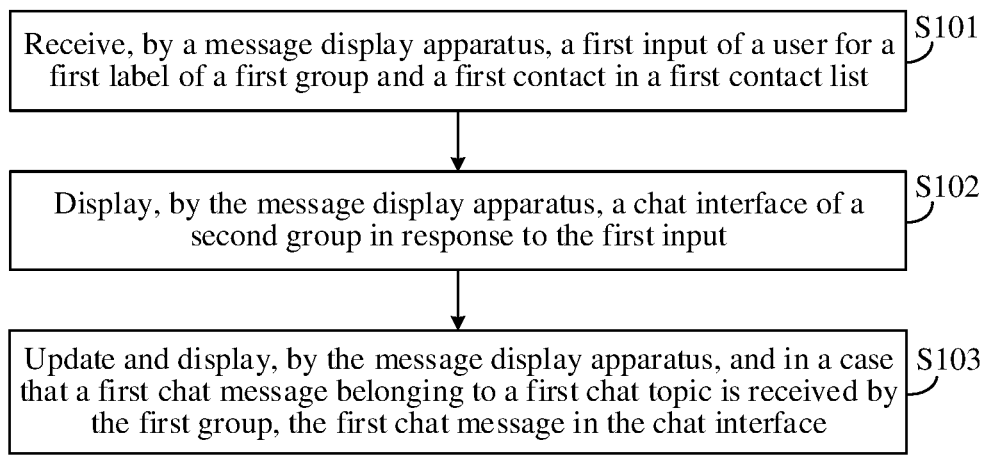
FIG. 1 is a schematic diagram of a message display method provided by an embodiment of this application.

The technical solutions in embodiments of this application are clearly described in the following with reference to the accompanying drawings in the embodiments of this application. Apparently, the described embodiments are merely some rather than all of the embodiments of this application. All other embodiments obtained by a person of ordinary skill in the art based on the embodiments of this application shall fall within the protection scope of this application.

Terms "first" and "second" in the specification and claims of this application are used to distinguish similar objects, but are unnecessarily used to describe a specific sequence or order. It is to be understood that such used data is interchangeable where appropriate so that the embodiments of this application can be implemented in an order other than those illustrated or described here. In addition, "and/or" used in this specification and the claims represents at least one of the connected objects, and the character "I" generally represents that associated objects in front of and behind it are in an "or" relationship.

In the embodiments of this application, the word such as "exemplarily" or "for example" is used to mean serving as an example, an illustration, or a description. Any embodiment or design scheme described as an "exemplarily" or "for example" in the embodiments of this application should not be explained as having more advantages than another embodiment or design scheme. To be specific, the use of the word such as "exemplarily" or "for example" is intended to present the related concepts in a specific manner.

Embodiments of this application provide a message display method and apparatus and an electronic device, a first input of a user for a first label of a first group and a first contact in a first contact list may be received, and the first label is used to indicate a real-time chat message belonging to a first chat topic; a chat interface of a second group is displayed in response to the first input, and the second group is a group created according to the first contact and the first label; and in a case that a first chat message belonging to the first chat topic is received by the first group, the first chat message is updated and displayed in the chat interface. Through this solution, according to an input of a user for a label and a contact in a certain group, a chat interface of a group composed of the label and the contact may be displayed. Therefore, whenever the group receives a new chat message belonging to a specific chat topic indicated by the label, the new chat message may be synchronously updated and displayed in the chat interface, so that there is no need for the user to trigger the electronic device multiple times to forward real-time messages in this group to the contact, and the contact may directly view the real-time messages in the chat interface. In this way, through the message display method provided by the embodiments of this application, the way for the electronic device to share the messages may be more convenient.

The message display method and apparatus and the electronic device provided by the embodiments of this application are described in detail below through embodiments and application scenarios with reference to the accompanying drawings.

As shown in FIG. 1, an embodiment of this application provides a message display method, including the following S101 to S103.

S101. A message display apparatus receives a first input of a user for a first label of a first group and a first contact in a first contact list.

The above first label is used to indicate a real-time chat message belonging to a first chat topic.

Optionally, the above first group is any group in communication applications installed on an electronic device.

Optionally, in this embodiment of this application, the first group may include at least one label, and the first label is a label among the at least one label. For example, each label may include a corresponding chat topic.

Exemplarily, assuming that the first chat topic is house price adjustment, the first label is used to indicate real-time chat messages belonging to the "house price adjustment" chat topic in the first group, so that the first label may include the "house price adjustment" topic.

Optionally, the above first contact list may include the following 3 possible cases:
(1) the first contact list is an address book list of a current logged-in account of the electronic device;
(2) the first contact list is a group member list in the first group; and
(3) the first contact list is a group member list in groups other than the first group.

Optionally, the above first contact is any contact in the first contact list, and the number of the first contact may be one or more, which is determined according to actual use demands, and is not limited in this embodiment of this application.

Optionally, the above first input may be a touch input, a speech input or a gesture input of the user for the first label and the first contact. For example, the touch input is a click input of the user for the first label and the first contact. Of course, the above first input may further be other possible inputs, which is not limited in this embodiment of this application.

S102. The message display apparatus displays a chat interface of a second group in response to the first input.

The above second group is a group created according to the first contact and the first label.

For example, the above second group may be a group created according to the first contact, a target account and the first label, and the target account is the current logged-in account of the electronic device.

It can be understood that the above second group is a virtual group.

Optionally, since the first label may be used as a virtual contact, the message display apparatus may create a virtual group, namely the second group, according to the first contact, the target account and the first label, so that group members in the second group include the first contact, the target account and the first label. For example, the group members in the second group may send chat messages to the second group through the electronic device.

It is to be noted that, functions of the above second group may refer to functions of ordinary groups in the related art, which will not be repeated in this embodiment of this application. For example, the group members may view the chat messages displayed in the chat interface of the second group.

S103. The message display apparatus, in a case that a first chat message belonging to a first chat topic is received by the first group, updates and displays the first chat message in the chat interface.

Optionally, the above first chat message is a new chat message received by the first group in real time.

Optionally, since the first label is the group member in the second group, when the first group receives the first chat message belonging to the first chat topic, the first label may send the first chat message to the second group through the electronic device, so that the message display apparatus updates and displays the first chat message in the chat interface of the second group, that is, the new chat message received in the first group and belonging to the first chat topic is synchronized in the second group.

Figure 2A:
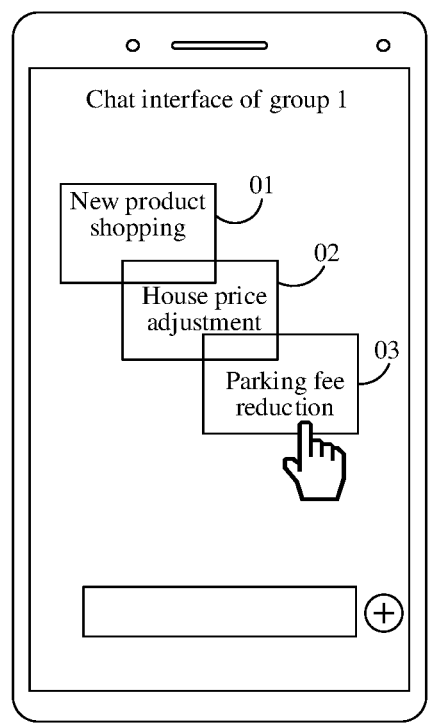
FIG. 2A is a first schematic diagram of a message synchronizing interface provided by an embodiment of this application.
Figure 2B:
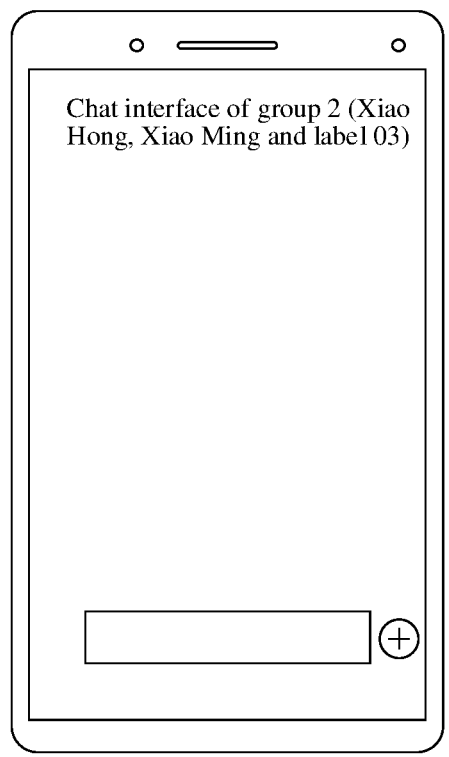
FIG. 2B is a second schematic diagram of a message synchronizing interface provided by an embodiment of this application.
Figure 2C:
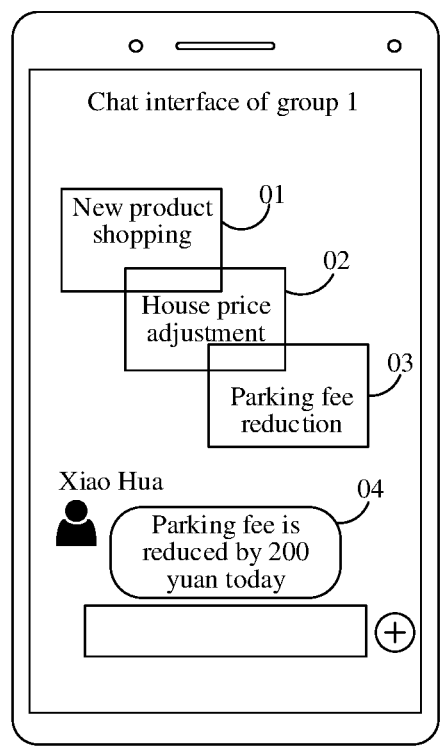
FIG. 2C is a third schematic diagram of a message synchronizing interface provided by an embodiment of this application.
Figure 2D:
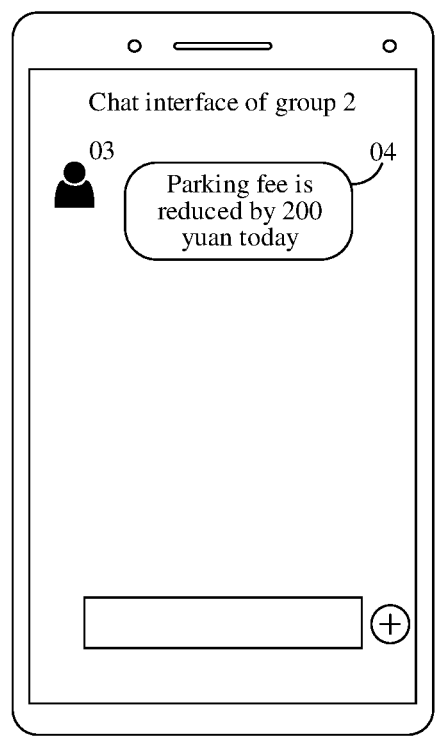
FIG. 2D is a fourth schematic diagram of a message synchronizing interface provided by an embodiment of this application.

Exemplarily, the message display apparatus being a mobile phone is taken as an example. As shown in FIG. 2A, the mobile phone displays a chat interface, including a label 01, a label 02 and a label 03, of a group 1, the label 01 is used to indicate real-time chat messages belonging to a "new product shopping" chat topic, the label 02 is used to indicate real-time chat messages belonging to the "house price adjustment" chat topic, and the label 03 is used to indicate real-time chat messages belonging to a "parking fee reduction" chat topic. If the user wants to share the real-time chat messages belonging to the "parking fee reduction" chart topic with a contact "Xiao Ming", the user can choose to click the label 03 and the contact "Xiao Ming". After receiving a click input of the user, the mobile phone may respond to the click input and display a chat interface of a group 2 as shown in FIG. 2B, and the group 2 is a virtual group created according to the label 03, the contact "Xiao Ming" and a current logged-in account "Xiao Hong" of the mobile phone. Then, when the group 1 receives a message 04 belonging to the "parking fee reduction" chat topic as shown in FIG. 2C, as shown in FIG. 2D, the mobile phone synchronously displays the message 04 in the chat interface of the group 2, that is, the message 04 is a message that is automatically sent by the label 03 to the chat interface of the group 2.

In the message display method provided by this embodiment of this application, according to an input of a user for a label and a contact in a certain group, a chat interface of a group composed of the label and the contact may be displayed. Therefore, whenever the group receives a new chat message belonging to a specific chat topic indicated by the label, the new chat message may be synchronously updated and displayed in the chat interface, so that there is no need for the user to trigger the electronic device multiple times to forward real-time messages in this group to the contact, and the contact may directly view the real-time messages in the chat interface. In this way, through the message display method provided by the embodiments of this application, the way for the electronic device to share the messages may be more convenient.

Optionally, before S101, the message display method provided by this embodiment of this application may further include the following S104 and S105.

S104. The message display apparatus determines M chat topics of the first group according to information of at least one group.

The above at least one group includes the first group and sub-groups of the first group, and M is a positive integer. The information of the at least one group includes at least one of the following: chat messages of the first group, chat messages of the sub-groups of the first group, or names of group members in the first group.

Optionally, the above sub-groups of the first group are groups that have a subordinate relationship with the first group, and the sub-groups of the first group are groups composed of some group members of the first group.

Optionally, "determining the M chat topics of the first group according to the information of the at least one group" includes: extracting first keyword information in the chat messages and second keyword information of the names of the group members first, and then determining the chat topic of the first group by at least one of the first keyword information or the second keyword information.

Exemplarily, assuming that the chat messages of the first group include a message 1 and a message 2, since the keyword information in the message 1 is "house price reduction", and the keyword information in the message 2 is "parking fee increase", it may be determined that the chat topic of the first group includes: a "house price" chat topic and a "parking fee" chat topic.

S105. The message display apparatus displays M labels.

One label corresponds to one chat topic, and the M labels include the first label.

Optionally, above S105 may be implemented through the following S105A and S105B.

S105A. The message display apparatus determines a priority of each chat topic in at least one chat topic according to data information of the user.

The above data information includes historical data information and real-time data information.

Exemplarily, the historical data information may be a click rate of the user browsing historical information, the number of browsing of the user browsing historical information, the number of downloading of the user browsing historical information, the number of sharing of the user browsing historical information and the like.

Exemplarily, the real-time data information may be geographical location information of a location where the user is located currently, latest topic information currently browsed by the user, attribute information of a current connection network of the user and the like.

It can be understood that the message display apparatus determines a degree of attention to each type of information according to the data information of the user, so as to determine the priority of each chat topic in at least one chat topic according to a level of the degree of attention.

S105B. The message display apparatus displays the M labels from high to low according to the priority of each chat topic.

Figure 3A:
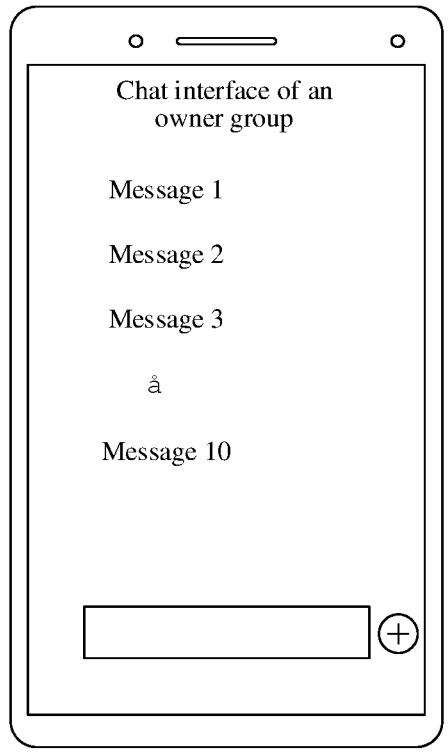
FIG. 3A is a first schematic diagram of a label displaying interface provided by an embodiment of this application.
Figure 3B:
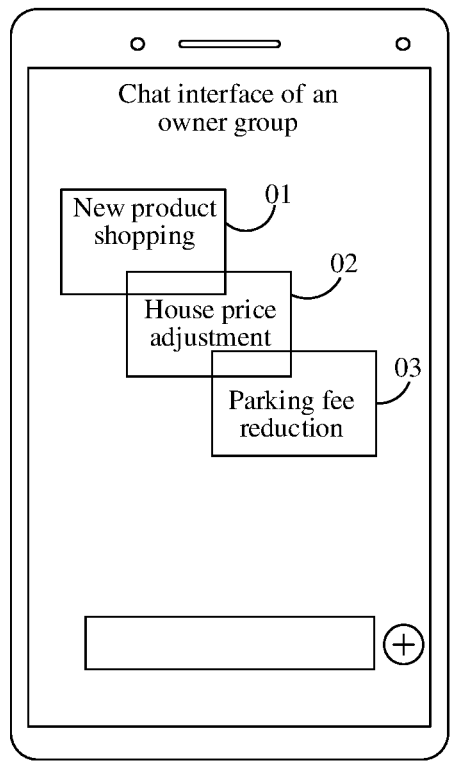
FIG. 3B is a second schematic diagram of a label displaying interface provided by an embodiment of this application.

Exemplarily, the message display apparatus being a mobile phone is taken as an example. As shown in FIG. 3A, the mobile phone displays a chat interface of an owner group, and the chat interface includes a message 1, a message 2, a message 3, . . . and a message 10. According to the "new product shopping" chat topic, the "house price adjustment" chat topic and the "parking fee reduction" chat topic of the owner group, the mobile phone may display a label 01, a label 02 and a label 03, as shown in FIG. 3B, the label 01 corresponds to the "new product shopping" chat topic, the label 02 corresponds to the "house price adjustment" chat topic, and the label 03 corresponds to the "parking fee reduction" chat topic. For example, if the mobile phone determines that a priority order of these 3 chat topics from high to low are the "new product shopping" chat topic, the "parking fee reduction" chat topic and the "house price adjustment" chat topic respectively according to the historical data information of the user, the mobile phone may display the label 01, the label 03 and the label 02 sequentially according to the priority order of these 3 chat topics.

In the message display method provided by this embodiment of this application, since a plurality of chat topics of the group may be determined according to information of a certain group, and a plurality of labels corresponding to the plurality of chat topics are displayed, the user may quickly view message contents of different chat topics in the group through the plurality of labels.

Optionally, after above S104, the message display method provided by this embodiment of this application may further include the following S106.

S106. The message display apparatus displays a first identifier in a case that a second chat message in the first group is in a read state and a sub-group of the first group receives a third chat message.

The above first identifier is used to indicate that the third chat message is in the read state, and the third chat message is a chat message with the same content as the second chat message.

Optionally, "displaying, by the message display apparatus, the first identifier" in above S106 may include the following three possible cases:

(1) the first identifier is displayed in a chat interface of the sub-group of the first group;
(2) the first identifier is displayed on an icon of the sub-group of the first group; and
(3) the first identifier is displayed on a notification message bar of the sub-group of the first group.

Figure 4A:
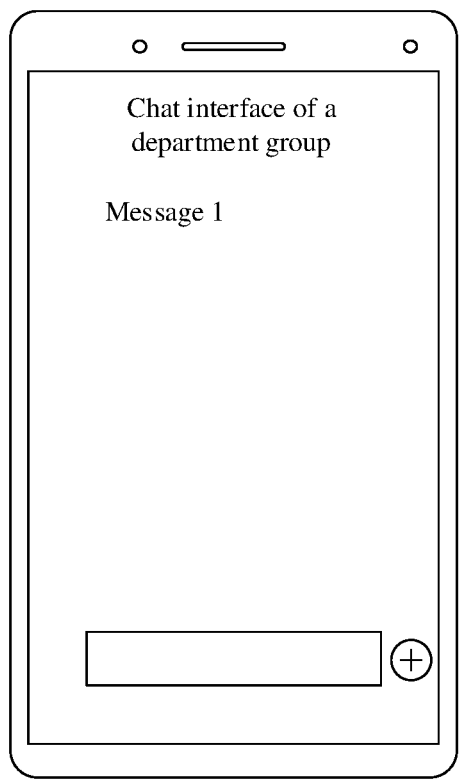
FIG. 4A is a first schematic diagram of a read marking interface provided by an embodiment of this application.
Figure 4B:
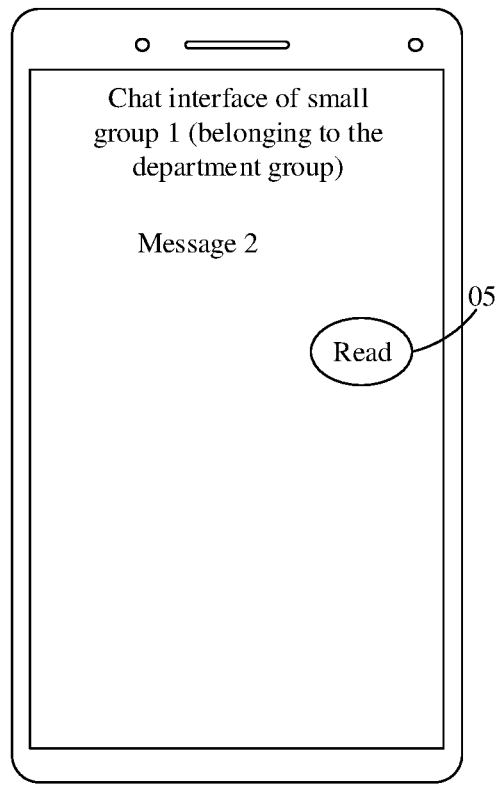
FIG. 4B is a second schematic diagram of a read marking interface provided by an embodiment of this application.

Exemplarily, the message display apparatus being a mobile phone is taken as an example. As shown in FIG. 4A, the mobile phone displays a message 1 in a chat interface of a department group. If a sub-group "small group 1" of the department group receives a message 2 with the same content as the message 1, as shown in FIG. 4B, the mobile phone may display an identifier 05 "read" in a chat interface of the small group 1. In this way, the user may know that the message 2 is in the read state through the identifier 05.

In the message display method provided by this embodiment of this application, in a case that a certain message received in a group is in the read state, if the sub-group of this group receives a new chat message with the same content as the message, an identifier used to indicate that the new chat message is in the read state may be displayed, and thus the user may know that the sub-group also receives the same message through the identifier. In this way, it can not only prevent the user from missing other messages, but also prevent the user from repeatedly viewing the same message, and time of the user is saved.

Optionally, after above S104, the message display method provided by this embodiment of this application may further include the following S107.

S107. The message display apparatus, in a case that the first group includes a fourth chat message meeting a preset condition, hides the fourth chat message and displays a second identifier.

The above second identifier is used to indicate feature information of the fourth chat message.

Optionally, the above preset condition may be set at delivery of the electronic device or set by the user autonomously. Of course, the user may further trigger the message display apparatus to modify the preset condition according to the actual use demands, which is determined according to actual situations, and is not limited in this embodiment of this application.

Optionally, the above preset condition may include at least one of the following: a similarity of the message contents of the chat messages being greater than a preset threshold (that is, the fourth chat message is a repeated message), the chat message being not associated with other chat messages except for the chat message, or the chat messages being symbols and/or emoticons.

Optionally, the feature information of the above fourth chat message may include the message number and a message attribute of hidden fourth chat messages, and the message attribute is used to reflect whether the fourth chat messages are repeated messages, useless messages or other possible messages. The useless messages are messages whose message contents have no substantive meanings.

Figure 5:
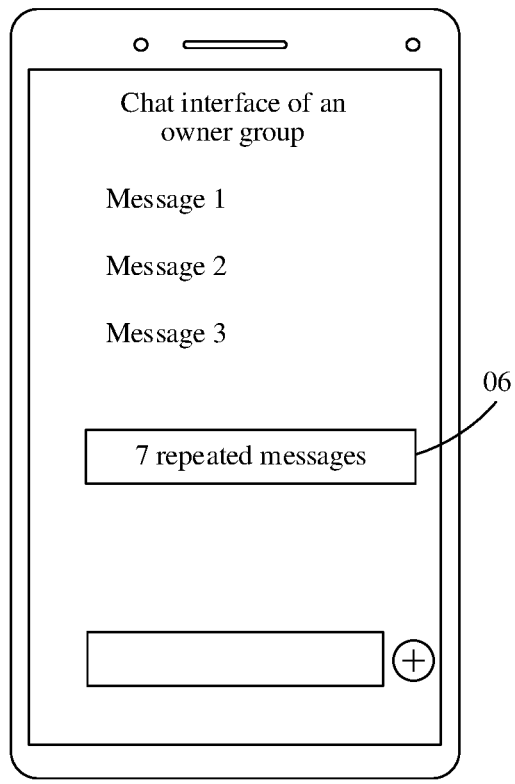
FIG. 5 is a schematic diagram of a message hiding interface provided by an embodiment of this application.

Exemplarily, the message display apparatus being a mobile phone is taken as an example. FIG. 3A is still taken as an example, and the mobile phone displays a message 1 to message 10 in the chat interface of the owner group. If the mobile phone determines that the message contents of the message 4 to the message 10 are the same, that is, the message 4 to the message 10 are the repeated messages, as shown in FIG. 5, the mobile phone may hide the message 4 to the message 10 and display an identifier 06, the identifier 06 is used to indicate that the number of hidden messages is 7, and the hidden messages are the repeated messages.

In the message display method provided by this embodiment of this application, since in a case that one group includes a chat message meeting the preset condition, the chat message may be hidden, and an identifier used to indicate the feature information of the chat message is displayed. Therefore, on the one hand, more effective chat messages may be displayed in the chat interface of this group, so that efficiency of the user to quickly obtain effective information is improved; and on the other hand, the user may know that there are hidden chat messages in this group and features of the hidden chat messages through the identifier.

Optionally, after above S107, the message display method provided by this embodiment of this application may further include: displaying a target control by the message display apparatus, the target control being used to trigger to display a fourth chat message; receiving an input of the user for the target control by the message display apparatus; and displaying, by the message display apparatus, the fourth chat message in a chat interface of the first group in response to the input. In this way, in a case that the target control is displayed in the chat interface of the first group, the user may trigger the chat interface to expand and display the hidden messages in the chat interface through the input for the target control, so that the user can conveniently view the hidden chat messages.

Optionally, after above S105, the message display method provided by this embodiment of this application may further include the following S108 to S109.

S108. The message display apparatus receives a second input of a user for a second label and a second contact in a second contact list.

The above second label is a label among the M labels.

Optionally, the above second label, second contact list and second contact may be the same or different from the first label, first contact list and first contact in the above embodiment. A description of the second label may refer to the description of the first label in the above embodiment; a description of the second contact list may refer to the description of the first contact list in the above embodiment; and a description of the second contact may refer to the description of the first contact in the above embodiment, which will not be repeated in this embodiment of this application.

Optionally, the above second input may be a touch input, a speech input or a gesture input of the user for the second label and the second contact. For example, the touch input is a click input of the user for the second label and the second contact. Of course, the above second input may further be other possible inputs, which is not limited in this embodiment of this application.

S109. The message display apparatus sends the second label to the second contact in response to the second input.

The above second label is used to indicate a real-time chat message belonging to a second chat topic.

Exemplarily, the message display apparatus being a mobile phone is taken as an example. With reference to FIG. 2A, the mobile phone displays a chat interface, including a label 01, a label 02 and a label 03, of a group 1, the label 01 is used to indicate real-time chat messages belonging to a "new product shopping" chat topic, the label 02 is used to indicate real-time chat messages belonging to the "house price adjustment" chat topic, and the label 03 is used to indicate real-time chat messages belonging to a "parking fee reduction" chat topic. If the user wants to share the real-time chat messages belonging to the "parking fee reduction" chart topic with a contact "Xiao Ming", the user can choose to click the label 03 and the contact "Xiao Ming". After receiving the click input of the user, the mobile phone may send the label 03 to the contact "Xiao Ming" in response to the click input. Therefore, the contact "Xiao Ming" may view the real-time chat message belonging to the "parking fee reduction" chat topic through the label 03.

In the message display method provided by this embodiment of this application, in a case that a plurality of labels of a certain group are displayed, since through an input for a label among the plurality of labels and a contact, the user may trigger to send this label to the contact, therefore, the contact may quickly view a real-time chat message belonging to a certain chat topic and indicated by this label through this label, so that when the group receives a new chat message belonging to being indicated by this label, there is no need for the user to trigger the electronic device multiple times to forward the real-time chat message to the contact, so as to improve the efficiency of the electronic device to share messages.

Optionally, after above S109, the message display method provided by this embodiment of this application may further include: receiving the second label by a device of the second contact, and displaying the second label in a suspension mode in a target interface; receiving an input of the user for the second label by the device of the second contact; and displaying, by the device of the second contact, the real-time chat message belonging to the second chat topic and indicated by the second label in response to the input.

Optionally, the above target interface may be a desktop interface, or a chat interface between the second contact and a target account, and the target account is a current logged-in account of the electronic device.

Optionally, after displaying the second label in a suspension mode in the target interface, the message display method provided by this embodiment of this application may further include: updating, in a case that the first group receives a new chat message belonging to the second chat topic, the real-time chat message belonging to the second chat topic and indicated by the second label by the device of the second contact; receiving the input of the user for the second label by the device of the second contact; and displaying, by the device of the second contact, the updated real-time chat message belonging to the second chat topic and indicated by the second label in response to the input.

In the message display method provided by this embodiment of this application, in a case that a plurality of labels of a certain group are displayed, since through an input for a label among the plurality of labels and a contact, the user may trigger to send this label to the contact, therefore, after the device of the contact receives this label, the contact may directly and quickly view a real-time chat message belonging to a certain chat topic and indicated by this label through this label, without relying on message forwarding of other users.

Optionally, after above S105, the message display method provided by this embodiment of this application may further include the following S110 and S111.

S110. The message display apparatus receives a third input for the first label.

Optionally, the above third input may be a touch input, a speech input or a gesture input of the user for the first label. For example, the touch input is a click input of the user for the first label. Of course, the above third input may further be other possible inputs, which is not limited in this embodiment of this application.

S111. The message display apparatus displays a fifth chat message indicated by the first label in response to the third input.

The above fifth chat message includes at least one of the following: chat messages belonging to the first chat topic in the first group, or chat messages belonging to the first chat topic in the sub-groups of the first group.

Figure 6:
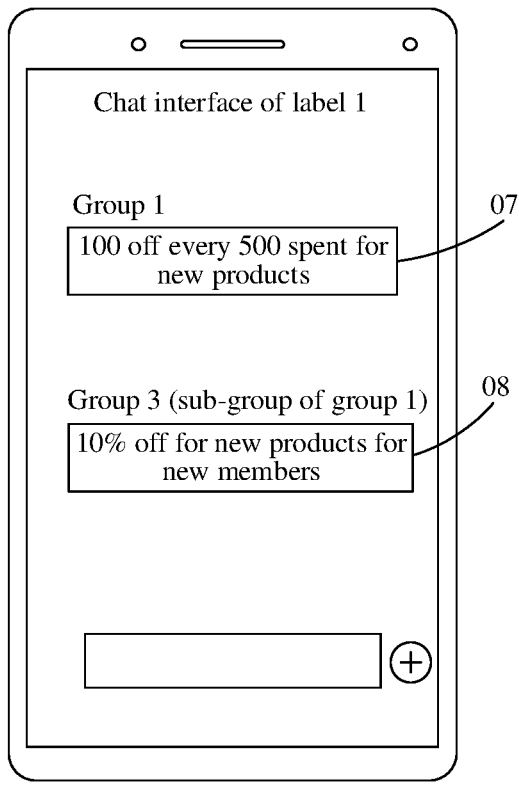
FIG. 6 is a schematic diagram of a message detail viewing interface provided by an embodiment of this application.

Exemplarily, the message display apparatus being a mobile phone is taken as an example. With reference to FIG. 2A, the mobile phone displays a chat interface, including a label 01, a label 02 and a label 03, of a group 1, the label 01 is used to indicate real-time chat messages belonging to a "new product shopping" chat topic, the label 02 is used to indicate real-time chat messages belonging to the "house price adjustment" chat topic, and the label 03 is used to indicate real-time chat messages belonging to a "parking fee reduction" chat topic. If the user wants to view the real-time chat messages belonging to the "new product shopping" chart topic and indicated by the label 01, the user may click the label 01. After receiving the click input, and in response to the click input, the mobile phone displays a message 07 belonging to the "new product shopping" chat topic in a group 1 and a message 08 belonging to the "new product shopping" chat topic in a group 3, as shown in FIG. 6.

In the message display method provided by this embodiment of this application, in a case that a plurality of labels of a certain group are displayed, through an input for a label among the plurality of labels, the user may trigger to display a chat message indicated by the label, that is, the user may view chat messages of a specific chat topic through the label, without spending a long time searching for interested chat messages in the chat interface, so that the efficiency of the user to view effective messages, and time of the user is saved.

It is to be noted that, in the message display method provided by this embodiment of this application, an executive body may be a message display apparatus (for example, the message display apparatus may be an electronic device or an external device on the electronic device), or a control module for executing the message display method in the message display apparatus. In this embodiment of this application, taking the message display apparatus executing the message display method as an example, the message display method provided by this embodiment of this application is described.

Figure 7:
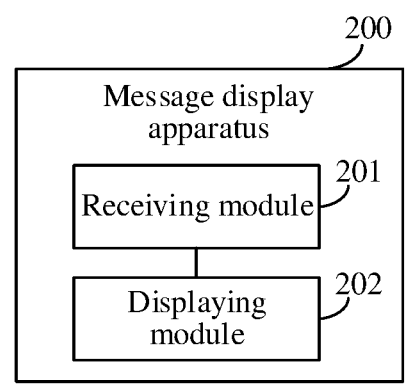
FIG. 7 is a schematic structural diagram of a message display apparatus provided by an embodiment of this application.

As shown in FIG. 7, an embodiment of this application provides a message display apparatus 200, including a receiving module 201 and a displaying module 202. The receiving module 201 is configured to receive a first input of a user for a first label of a first group and a first contact in a first contact list, and the first label is used to indicate a real-time chat message belonging to a first chat topic. The displaying module 202 is configured to display a chat interface of a second group in response to the first input received by the receiving module 201, the second group being a group created according to the first contact and the first label; and update and display, in a case that a first chat message belonging to the first chat topic is received by the first group, the first chat message in the chat interface.

Optionally, the message display apparatus may further include a determining module. The determining module is configured to determine M chat topics of the first group according to information of at least one group before the receiving module receives the first input of the user for the first label of the first group and the first contact in the first contact list, the at least one group includes the first group and sub-groups of the first group, and M is a positive integer. The displaying module is further configured to display M labels, one label corresponds to one chat topic, and the M labels include the first label. The information of the at least one group includes at least one of the following: chat messages of the first group, chat messages of the sub-groups of the first group, or names of group members in the first group.

Optionally, the displaying module is configured to display a first identifier in a case that a second chat message in the first group is in a read state and a sub-group of the first group receives a third chat message, the first identifier is used to indicate that the third chat message is in the read state, and the third chat message is a chat message with the same content as the second chat message.

Optionally, the message display apparatus may further include a processing module. The processing module is configured to hide a fourth chat message in a case that the first group includes the fourth chat message meeting a preset condition. The displaying module 202 is further configured to display a second identifier after the processing module hides the fourth chat message, and the second identifier is used to indicate feature information of the fourth chat message.

Optionally, the message display apparatus may further include a sending module. The receiving module is further configured to receive a second input of a user for a second label and a second contact in a second contact list after the displaying module displays the M labels, and the second label is a label in the M labels. The sending module is configured to send, in response to the second input received by the receiving module, the second label to the second contact, and the second label is used to indicate a real-time chat message belonging to a second chat topic.

Optionally, the receiving module is further configured to receive a third input for the first label after the displaying module displays the M labels. The displaying module is further configured to display, in response to the third input received by the receiving module, a fifth chat message indicated by the first label. The fifth chat message may include at least one of the following: chat messages belonging to the first chat topic in the first group, or chat messages belonging to the first chat topic in the sub-groups of the first group.

Optionally, the determining module is further configured to determine a priority of each chat topic in at least one chat topic according to data information of the user. The displaying module is configured to display the M labels from high to low according to the priority of each chat topic. The data information includes historical data information and real-time data information.

In the message display apparatus provided by this embodiment of this application, according to an input of a user for a label and a contact in a certain group, a chat interface of a group composed of the label and the contact may be displayed. Therefore, whenever the group receives a new chat message belonging to a specific chat topic indicated by the label, the new chat message may be synchronously updated and displayed in the chat interface, so that there is no need for the user to trigger the electronic device multiple times to forward real-time messages in this group to the contact, and the contact may directly view the real-time messages in the chat interface. In this way, through the message display apparatus provided by this embodiment of this application, the way for the electronic device to share the messages may be more convenient.

The message display apparatus in this embodiment of this application may be an apparatus, and may also be a component, an integrated circuit or a chip in a terminal. The apparatus may be a mobile electronic device, and may also be a non-mobile electronic device. Exemplarily, the mobile electronic device may be a mobile phone, a tablet computer, a notebook computer, a palm computer, a vehicle-mounted terminal, a wearable device, an ultra-mobile personal computer (UMPC), a netbook, or a personal digital assistant (PDA); and the non-mobile electronic device may be a server, network attached storage (NAS), a personal computer (PC), a television (TV), a teller machine, or an automated machine, which are not specifically limited in this embodiment of this application.

The message display apparatus in this embodiment of this application may be an apparatus with an operating system. The operating system may be an Android operating system, may be an ios operating system, or may be another possible operating system, which is not specifically limited in this embodiment of this application.

The message display apparatus provided by this embodiment of this application can implement all processes implemented by the method embodiments shown in FIG. 1 to FIG. 6, which will not be repeated here to avoid repetition.

Figure 8:
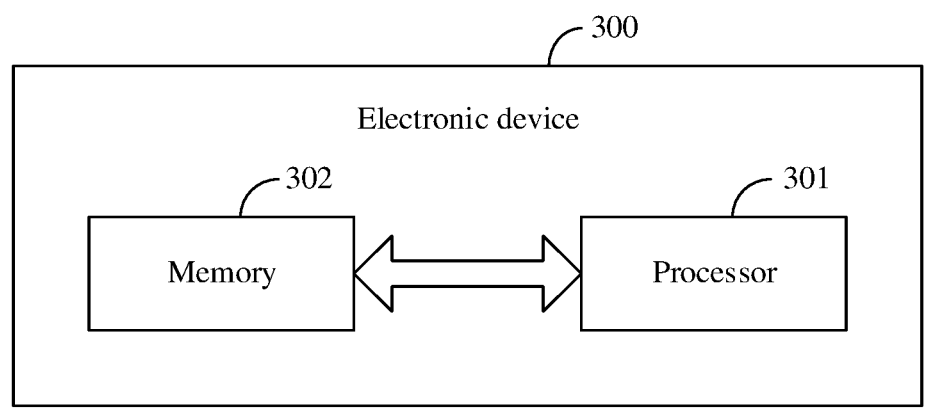
FIG. 8 is a schematic structural diagram of an electronic device provided by an embodiment of this application.

Optionally, as shown in FIG. 8, an embodiment of this application further provides an electronic device 300, including a processor 301, a memory 302, and a program or an instruction stored on the memory 302 and executable on the processor 301, and the program or the instruction, when executed by the processor 301, implements the processes of the embodiments of the above message display method, which can achieve the same technical effects and will not be repeated here to avoid repetition.

The electronic device in this embodiment of this application includes the above mobile electronic device and non-mobile electronic device.

Figure 9:
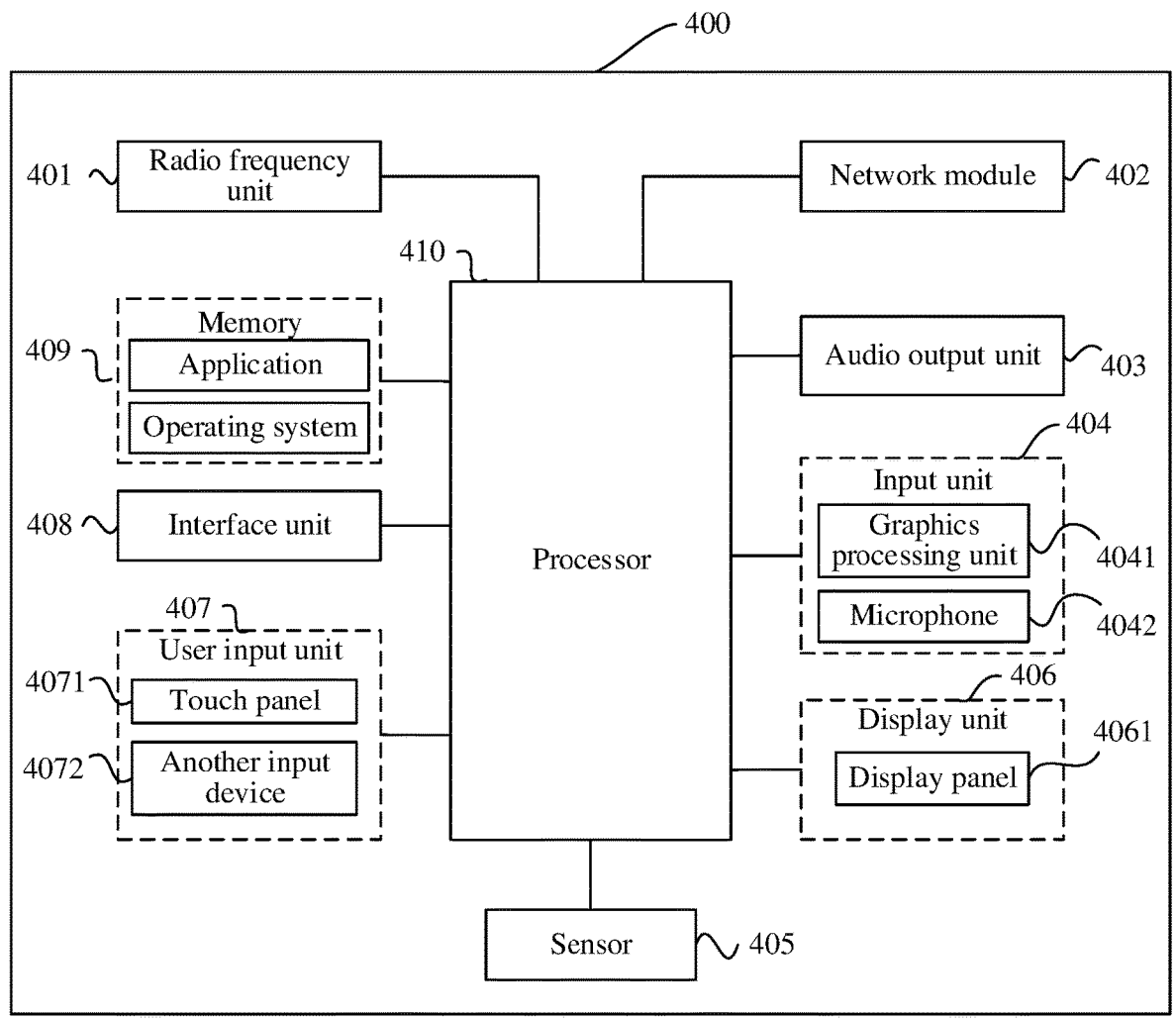
FIG. 9 is a schematic hardware diagram of an electronic device provided by an embodiment of this application.

FIG. 9 is a schematic structural diagram of hardware of an electronic device for implementing embodiments of this application.

The electronic device 400 includes, but is not limited to: components such as a radio frequency unit 401, a network module 402, an audio output unit 403, an input unit 404, a sensor 405, a display unit 406, a user input unit 407, an interface unit 408, a memory 409, and a processor 410.

A person skilled in the art may understand that the terminal device 400 may further include a power supply (such as a battery) for supplying power to the components. The power supply may be logically connected to the processor 410 by using a power management system, thereby implementing functions, such as charging, discharging, and power consumption management, by using the power management system. The structure of the electronic device shown in FIG. 9 constitutes no limitation to the electronic device, and the electronic device may include more or fewer components than those shown in the figure, or some components may be combined, or a different component deployment may be used, which will not be repeated here.

The user input unit 407 is configured to receive a first input of a user for a first label of a first group and a first contact in a first contact list, and the first label is used to indicate a real-time chat message belonging to a first chat topic. The display unit 406 is configured to display a chat interface of a second group in response to the first input received by the user input unit 407, the second group being a group created according to the first contact and the first label; and update and display, in a case that a first chat message belonging to the first chat topic is received by the first group, the first chat message in the chat interface.

Optionally, the processor 410 is configured to determine M chat topics of the first group according to information of at least one group before the user input unit 407 receives the first input of the user for the first label of the first group and the first contact in the first contact list, the at least one group includes the first group and sub-groups of the first group, and M is a positive integer. The display unit 406 is further configured to display M labels, one label corresponds to one chat topic, and the M labels include the first label. The information of the at least one group includes at least one of the following: chat messages of the first group, chat messages of the sub-groups of the first group, or names of group members in the first group.

Optionally, the display unit 406 is configured to display a first identifier in a case that a second chat message in the first group is in a read state and a sub-group of the first group receives a third chat message, the first identifier is used to indicate that the third chat message is in the read state, and the third chat message is a chat message with the same content as the second chat message.

Optionally, the processing unit 410 is further configured to hide a fourth chat message in a case that the first group includes the fourth chat message meeting a preset condition. The display unit 406 is further configured to display a second identifier, and the second identifier is used to indicate feature information of the fourth chat message.

Optionally, the user input unit 407 is further configured to receive a second input of a user for a second label and a second contact in a second contact list after the displaying module displays the M labels, and the second label is a label in the M labels. The radio frequency unit 401 is configured to send, in response to the second input received by the user input unit 407, the second label to the second contact, and the second label is used to indicate a real-time chat message belonging to a second chat topic.

Optionally, the user input unit 407 is further configured to receive a third input for the first label after the displaying module displays the M labels. The display unit 406 is further configured to display, in response to the third input received by the user input unit 407, a fifth chat message indicated by the first label. The fifth chat message may include at least one of the following: chat messages belonging to the first chat topic in the first group, or chat messages belonging to the first chat topic in the sub-groups of the first group.

Optionally, the processor 410 is further configured to determine a priority of each chat topic in at least one chat topic according to data information of the user. The display unit 406 is configured to display the M labels from high to low according to the priority of each chat topic. The data information includes historical data information and real-time data information.

In the electronic device provided by this embodiment of this application, according to an input of a user for a label and a contact in a certain group, a chat interface of a group composed of the label and the contact may be displayed. Therefore, whenever the group receives a new chat message belonging to a specific chat topic indicated by the label, the new chat message may be synchronously updated and displayed in the chat interface, so that there is no need for the user to trigger the electronic device multiple times to forward real-time messages in this group to the contact, and the contact may directly view the real-time messages in the chat interface. In this way, the way to share the messages through the electronic device provided by this embodiment of this application is more convenient.

It is to be understood that in this embodiment of this application, the input unit 404 may include a graphics processing unit (GPU) 4041 and a microphone 4042. The graphics processing unit 4041 performs processing on image data of a static picture or a video that is obtained by an image acquisition apparatus (such as, a camera) in a video acquisition mode or an image acquisition mode. The display unit 406 may include a display panel 4061. The display panel 4061 may be configured in the form of a liquid crystal display, an organic light-emitting diode, or the like. The user input unit 407 includes a touch panel 4071 and another input device 4072. The touch panel 4071 is also called a touch screen. The touch panel 4071 may include two parts: a touch detection apparatus and a touch controller. The another input device 4072 may include, but is not limited to, a physical keyboard, a functional key (such as a volume control key and a switch key), a track ball, a mouse, and a joystick, which will not be repeated here. The memory 409 may be configured to store a software program and various pieces of data, including but not limited to an application and an operating system. The processor 410 may integrate an application processor and a modem processor. The application processor mainly processes an operating system, a user interface, an application program, and the like. The modem processor mainly processes wireless communication. It may be understood that, the above modem processor may not be integrated into the processor 410.

An embodiment of this application further provides a non-transitory readable storage medium, storing a program or instruction, the program or instruction, when executed by a processor, implements the processes of the embodiments of the above message display method, which can achieve the same technical effects and will not be repeated here to avoid repetition.

The processor is the processor in the electronic device in the above embodiment. The non-transitory readable storage medium includes a non-transitory computer-readable storage medium, such as a computer read-only memory (ROM), a random access memory (RAM), a magnetic disk, or an optical disc.

An embodiment of this application further provides a chip, including a processor and a communication interface, the communication interface is coupled to processor, and the processor is configured to run a program or instruction to implement the processes of the embodiments of the above message display method, which can achieve the same technical effects and will not be repeated here to avoid repetition.

It is to be understood that the chip mentioned in this embodiment of this application may also be called a system-level chip, a system chip, a chip system, a system-on-a-chip or the like.

It is to be noted that, the terms "include", "contain", or any other variation thereof herein is intended to cover a non-exclusive inclusion, so that a process, a method, an article or an apparatus including a series of elements not only includes those elements, but also includes other elements not listed clearly, or further includes elements inherent to the process, the method, the article or the apparatus. Without more limitations, elements defined by the sentence "including one . . . " do not exclude that there are still other same elements in the process, method, article, or apparatus including the elements. Besides, the scope of the method and the apparatus in implementations of this application is not limited to executing functions according to a shown or discussed sequence, it may also include that functions are executed in a basically simultaneously mode or in an opposite sequence according to the involved functions, for example, the described method may be executed in an order different from the described one, and various steps may also be added, omitted, or combined. In addition, features described in some examples may also be combined in other examples.

According to the descriptions in the foregoing implementations, a person skilled in the art may clearly learn that the method in the above embodiments may be implemented by relying on software and a commodity hardware platform or by using hardware, but in many cases, the former is a preferred implementation. Based on such an understanding, the technical solutions of this application essentially, or the part contributing to the related art, may be presented in the form of a software product. The computer software product is stored in a storage medium (such as, an ROM/RAM, a magnetic disk, and an optical disc) including several instructions to enable a terminal (which may be a mobile phone, a computer, a server, an air conditioner, a network device, or the like) to perform the method described in the embodiments of this application.

The embodiments of this application have been described above with reference to the accompanying drawings. This application is not limited to the specific implementations described above, and the specific implementations described above are merely schematic and not limitative. A person of ordinarily skilled in the art may make various variations under the teaching of this application without departing from the spirit of this application and the protection scope of the claims, and such variations shall all fall within the protection scope of this application.

What is claimed is:

1. A message display method, comprising:
   determining M chat topics of a first group according to information of at least one group, wherein the at least one group includes the first group, and M is a positive integer;
   displaying M labels, one label corresponding to one chat topic, and the M labels including a first label;
   receiving a first input of a user for the first label of the first group and a first contact in a first contact list, the first label being used to indicate a real-time chat message belonging to the first chat topic;
   displaying a chat interface of a second group in response to the first input, the second group being a group created according to the first contact and the first label;
   after creating the second group, receiving a new chat message belonging to the first chat topic by the first group; and
   in response to receiving the new chat message belonging to the first chat topic by the first group, updating the chat interface of the second group to synchronously display the new chat message in the chat interface of the second group.

2. The method according to claim 1, further comprising:
   wherein the at least one group includes the first group and sub-groups of the first group; and
   wherein
   the information of the at least one group comprises at least one of: chat messages of the first group, chat messages of the sub-groups of the first group, or names of group members in the first group.

3. The method according to claim 2, after determining the M chat topics of the first group according to the information of at least one group, further comprising:
   displaying a first identifier, in a case that a second chat message in the first group is in a read state and a sub-group of the first group receives a third chat message, wherein the first identifier is used to indicate that the third chat message is in the read state, and the third chat message is a chat message with a same content as the second chat message.

4. The method according to claim 2, after determining the M chat topics of the first group according to the information of the at least one group, further comprising:
   hiding a fourth chat message and displaying a second identifier, in a case that the first group includes the fourth chat message meeting a preset condition, wherein the second identifier is used to indicate feature information of the fourth chat message.

5. The method according to claim 2, after displaying the M labels, further comprising:
   receiving a second input of a user for a second label and a second contact in a second contact list, the second label being a label in the M labels; and
   sending, in response to the second input, the second label to the second contact, wherein the second label is used to indicate a real-time chat message belonging to a second chat topic.

6. The method according to claim 2, after displaying the M labels, further comprising:
   receiving a third input for the first label; and
   displaying, in response to the third input, a fifth chat message indicated by the first label; wherein
   the fifth chat message comprises at least one of: chat messages belonging to the first chat topic in the first group, or chat messages belonging to the first chat topic in the sub-groups of the first group.

7. A chip, comprising a processor and a communication interface, wherein the communication interface is coupled to the processor, and the processor is configured to run a program or an instruction to implement the method according to claim 1.

8. A computer software product stored in a non-transitory readable storage medium, executed by at least one processor to implement the method according to claim 1.

9. An electronic device, comprising a processor, a memory, and a program or an instruction stored in the memory and executable on the processor, wherein the program or the instruction, when executed by the processor, causes the electronic device to perform:
   determining M chat topics of a first group according to information of at least one group, wherein the at least one group includes the first group, and M is a positive integer;
   displaying M labels, one label corresponding to one chat topic, and the M labels including a first label;
   receiving a first input of a user for the first label of the first group and a first contact in a first contact list, the first label being used to indicate a real-time chat message belonging to the first chat topic;
   displaying a chat interface of a second group in response to the first input, the second group being a group created according to the first contact and the first label;
   after creating the second group, receiving a new chat message belonging to the first chat topic by the first group; and
   in response to receiving the new chat message belonging to the first chat topic by the first group, updating the chat interface of the second group to synchronously display the new chat message in the chat interface of the second group.

10. The electronic device according to claim 9, wherein the program or instruction, when executed by the processor, causes the electronic device to further perform:
   wherein the at least one group includes the first group and sub-groups of the first group; and wherein
the information of the at least one group comprises at least one of: chat messages of the first group, chat messages of the sub-groups of the first group, or names of group members in the first group.

11. The electronic device according to claim 10, wherein the program or the instruction, when executed by the processor, causes the electronic device to further perform:
displaying a first identifier, in a case that a second chat message in the first group is in a read state and a sub-group of the first group receives a third chat message, wherein the first identifier is used to indicate that the third chat message is in the read state, and the third chat message is a chat message with a same content as the second chat message.

12. The electronic device according to claim 10, wherein the program or the instruction, when executed by the processor, causes the electronic device to further perform:
hiding a fourth chat message and displaying a second identifier, in a case that the first group includes the fourth chat message meeting a preset condition, wherein the second identifier is used to indicate feature information of the fourth chat message.

13. The electronic device according to claim 10, wherein the program or the instruction, when executed by the processor, causes the electronic device to further perform:
receiving a second input of a user for a second label and a second contact in a second contact list, the second label being a label in the M labels; and
sending, in response to the second input, the second label to the second contact, wherein the second label is used to indicate a real-time chat message belonging to a second chat topic.

14. The electronic device according to claim 10, wherein the program or the instruction, when executed by the processor, causes the electronic device to further perform:
receiving a third input for the first label; and
displaying, in response to the third input, a fifth chat message indicated by the first label; wherein
the fifth chat message comprises at least one of: chat messages belonging to the first chat topic in the first group, or chat messages belonging to the first chat topic in the sub-groups of the first group.

15. A non-transitory readable storage medium, storing a program or an instruction, wherein the program or the instruction, when executed by a processor of an electronic device, causes the electronic device to perform:
determining M chat topics of a first group according to information of at least one group, wherein the at least one group includes the first group, and M is a positive integer;
displaying M labels, one label corresponding to one chat topic, and the M labels including a first label;
receiving a first input of a user for the first label of the first group and a first contact in a first contact list, the first label being used to indicate a real-time chat message belonging to the first chat topic;
displaying a chat interface of a second group in response to the first input, the second group being a group created according to the first contact and the first label;
after creating the second group, receiving a new chat message belonging to the first chat topic by the first group; and
in response to receiving the new chat message belonging to the first chat topic by the first group, updating the chat interface of the second group to synchronously display the new chat message in the chat interface of the second group.

16. The non-transitory readable storage medium according to claim 15,
wherein the program or instruction, when executed by the processor, causes the electronic device to further perform:
wherein the at least one group includes the first group and sub-groups of the first group; and
wherein
the information of the at least one group comprises at least one of: chat messages of the first group, chat messages of the sub-groups of the first group, or names of group members in the first group.

17. The non-transitory readable storage medium according to claim 16, wherein the program or the instruction, when executed by the processor, causes the electronic device to further perform:
displaying a first identifier, in a case that a second chat message in the first group is in a read state and a sub-group of the first group receives a third chat message, wherein the first identifier is used to indicate that the third chat message is in the read state, and the third chat message is a chat message with a same content as the second chat message.

18. The non-transitory readable storage medium according to claim 16, wherein the program or the instruction, when executed by the processor, causes the electronic device to further perform:
hiding a fourth chat message and displaying a second identifier, in a case that the first group includes the fourth chat message meeting a preset condition, wherein the second identifier is used to indicate feature information of the fourth chat message.

19. The non-transitory readable storage medium according to claim 16, wherein the program or the instruction, when executed by the processor, causes the electronic device to further perform:
receiving a second input of a user for a second label and a second contact in a second contact list, the second label being a label in the M labels; and
sending, in response to the second input, the second label to the second contact, wherein the second label is used to indicate a real-time chat message belonging to a second chat topic.

20. The non-transitory readable storage medium according to claim 16, wherein the program or the instruction, when executed by the processor, causes the electronic device to further perform:
receiving a third input for the first label; and
displaying, in response to the third input, a fifth chat message indicated by the first label; wherein
the fifth chat message comprises at least one of: chat messages belonging to the first chat topic in the first group, or chat messages belonging to the first chat topic in the sub-groups of the first group.

* * * * *